United States Patent
Chang et al.

(10) Patent No.: US 7,486,844 B2
(45) Date of Patent: Feb. 3, 2009

(54) COLOR INTERPOLATION APPARATUS AND COLOR INTERPOLATION METHOD UTILIZING EDGE INDICATORS ADJUSTED BY STOCHASTIC ADJUSTMENT FACTORS TO RECONSTRUCT MISSING COLORS FOR IMAGE PIXELS

(75) Inventors: Hung-An Chang, Taipei (TW); Homer H Chen, Tai-Chung (TW)

(73) Assignee: Avisonic Technology Corporation, Hsin-Chu (TW)

( * ) Notice: Subject to any disclaimer, the term of this patent is extended or adjusted under 35 U.S.C. 154(b) by 671 days.

(21) Appl. No.: 11/164,284

(22) Filed: Nov. 17, 2005

(65) Prior Publication Data

US 2007/0110300 A1    May 17, 2007

(51) Int. Cl.
*G06K 9/32* (2006.01)
(52) U.S. Cl. ................... 382/300; 382/266; 382/162
(58) Field of Classification Search ............ 392/300, 392/266, 199, 162; 358/525; 348/272, 252, 348/436.1, E11.004
See application file for complete search history.

(56) References Cited

U.S. PATENT DOCUMENTS

| | | | | |
|---|---|---|---|---|
| 4,885,631 A * | 12/1989 | Fukinuki et al. | ......... | 348/436.1 |
| 6,628,330 B1 * | 9/2003 | Lin | ............ | 348/252 |
| 6,810,156 B1 * | 10/2004 | Itoh | ............ | 382/300 |
| 7,088,392 B2 * | 8/2006 | Kakarala et al. | ............ | 348/272 |
| 7,242,819 B2 * | 7/2007 | Jiang | ............ | 382/300 |

FOREIGN PATENT DOCUMENTS

EP    0565948 A2 *   10/1993

OTHER PUBLICATIONS

B. K. Gunturk, J. Glotzbach, Y. Altunbasak, R. W. Schafer, and R. M. Mersereau, "Demosalcking: Color filter array interpolation.", IEEE Signal Processing Magazine, Jan. 2005, pp. 44-54.

D. Alleysson, S. Susstrunk and J. Herault, "Linear demosaicing inspired by the human visual system.", IEEE Transactions on Image Processing., Apr. 2005, pp. 439-449, vol. 14, No. 4.

P. Longere, X. Zhang P. B. Delahunt, and D. H. Brainard, "Perceptual assessment of demosaicing algorithm performance", Proceedings of the IEEE, Jan. 2002, pp. 123-132, vol. 90, No. 1.

(Continued)

*Primary Examiner*—Anh Hong Do
(74) *Attorney, Agent, or Firm*—Winston Hsu (57) ABSTRACT

A color interpolation method for processing a plurality of image pixels corresponding to a color filter array to reconstruct missing color components for each image pixel having a single color component. The color interpolation method includes: (a) detecting edges in a plurality of interpolating directions for a target image pixel and then generating a plurality of edge indicators respectively corresponding to the interpolating directions, wherein the edge indicators have been normalized by stochastic adjustment factors; and (b) reconstructing at least a missing color component of the target image pixel according to a plurality of neighboring image pixels respectively in the interpolating directions and the edge indicators of the interpolating directions, wherein each of the neighboring image pixels has a color component identical to the missing color component.

12 Claims, 4 Drawing Sheets

OTHER PUBLICATIONS

R. Lukac and K. N. Plataniotis, "Data-adaptive filters for demosaicking: A framework", IEEE Transactions on Consumer Electronics, May 2005, pp. 560-570, vol. 51, No. 2.

R. Lukac, K. Martin, and K.N. Plataniotis, "Demosaicked image postprocessing using local color ratios", IEEE Transactions on Circuits and Systems for Video Technology., Jun. 2004, pp. 914-920, vVol. 14, No. 6.

X. Wu and N. Zhang, "Primary-consistant soft-decision color demosaicking for digital cameras (patent pending)", IEEE Transactions on Image Processing, Sep. 2004, pp. 1263-1274, vol. 13, No. 9.

* cited by examiner

COLOR INTERPOLATION APPARATUS AND COLOR INTERPOLATION METHOD UTILIZING EDGE INDICATORS ADJUSTED BY STOCHASTIC ADJUSTMENT FACTORS TO RECONSTRUCT MISSING COLORS FOR IMAGE PIXELS

BACKGROUND OF THE INVENTION

1. Field of the Invention

The present invention relates to image processing, and more specifically, to a color interpolation apparatus and color interpolation method using edge indicators adjusted by stochastic adjustment factors to reconstruct missing colors for image pixels.

2. Description of the Prior Art

In an imaging system, three components of color information must be captured simultaneously to precisely presenting an image. To create an analogous digital imaging system that simultaneously captures all three components of the color information would require three individual imaging detectors. This would be prohibitive due to the high cost and would cause the packaging to be very complex. To keep the size and cost of a digital video imaging system to a minimum, an image sensor array of the system (using silicon chips) must keep its size small as well. Therefore, the number of color samples must be kept low. An alternative approach is to have each detector of the imaging system gathering data for a single color to create a sparse color image. Therefore, the imaging systems typically use a mosaic filter generally called a color filter array (CFA), and acquire a scene image by sampling one of the three different color components to obtain an array that stores only one color component per pixel. The imaging system gets a raw sensory data having less color samples per pixel because it ignores the other two color components for each pixel. Since each filter of the color filter array covers a single pixel and only allows a color in a specific spectral band to pass, before the scene image is further processed or displayed, the missing colors of each image pixel must be reconstructed so that each image pixel contains all three color components.

Because of the tri-stimulus nature of human color perception, to reconstruct a full color image (typically red, green, and blue or cyan, magenta, and yellow) from the raw sensory data, a color interpolation scheme is required to estimate these two missing color components for each of the image pixels. Based on an assumption that an object in the physical world usually gives rise to image intensities that vary smoothly over the image of the object, in order to economize processing resources, color interpolation is typically based upon color information at image pixels in a small neighborhood around each image pixel to be reconstructed. Given a known color filter array (CFA), such as Bayer pattern described in U.S. Pat. No. 3,971,065, the remaining two colors for each image pixel location can be reconstructed using color information provided by neighboring image pixels. The conventional color interpolation method uses replication of the values of the nearest neighboring image pixels, or alternatively uses linear or logarithmic averaging techniques for obtaining an average value of the neighboring image pixels for reconstructing the missing color. The color interpolation process to convert raw sensory image data into a full color image by estimating the missing color components of each image pixel from its neighboring image pixels is known as Demosaicing. Due to the aliasing effects caused by averaging (low-pass filtering) pixel values across the edges, most demosaicing approaches often introduce image effect problems like: zipper effects, false colors, or blur the edges of the image where there are dense edges. There are some conventional color interpolation methods to reduce or solve the image effect problems mentioned, such as: bilinear method, color difference based method, gradient-based method, and C2D2 (Color Correlations and Directional Derivatives) method. Most of the conventional methods can be classified into two categories: non-adaptive color interpolation or edge-directed adaptive color interpolation.

The non-adaptive color interpolation method involves the color interpolation as mentioned above, uniformly applied across the entire image, while the adaptive color interpolation, on the other hand, adjusts the weights of the color samples in the color interpolation process by utilizing the edge information. Moreover, a real-time application commonly requires an interpolation algorithm with minimum computational complexity to provide high quality images that are sharp and do not contain false color. The false color usually occurs around the edges of an image due to high spatial frequency. Localized spatial features, such as image edges and areas where hues of adjacent pixels change abruptly, cause estimation of a color to often be inaccurate. Further, false color usually occurs when one of the color components is missing making imaging systems that utilizes a CFA to acquire images particularly susceptible to this problem. Moreover, to provide sharp images with no false color, a well-known sharpening filter is usually applied to improve the image quality before displaying the image. However, when some color components are missing for each pixel, the color artifacts are not corrected with a sharpening filter, but are typically further visually enhanced after a sharpening filter is applied.

Therefore, the effectiveness of an adaptive color interpolation method highly depends on the edge detecting capability and the computational complexity of the interpolation algorithm when realizing the imaging system. In other words, the edge detecting capability plays an important role in color interpolation. Taking the C2D2 method for example, this method suffers from blurred edges and false colors. Therefore, there is a need for a color interpolation algorithm for digital imaging systems that uses fewer samples per image pixel yet can accurately reconstruct the missing color components to provide sharp images without zipper effects or false colors.

SUMMARY OF THE INVENTION

It is therefore one of the objectives of the claimed invention to provide a color interpolation apparatus and color interpolation method using edge indicators adjusted by stochastic adjustment factors to accurately reconstruct missing colors for image pixels, to solve the above problems.

According to one embodiment of the claimed invention, a color interpolation apparatus for processing a plurality of image pixels corresponding to a color filter array to reconstruct missing color components for each image pixel having a single color component is disclosed. The color interpolation apparatus comprises: an edge detection circuit for detecting edges in a plurality of interpolating directions for a target image pixel and then generating a plurality of edge indicators respectively corresponding to the interpolating directions by summing absolute values of a first color difference and a second color difference and then normalizing the sum of the absolute values with a stochastic adjustment factor for normalizing standard deviations of the interpolating directions, where the first color difference is the difference between color components of a first image pixel in the interpolating direction and a second image pixel in another interpolating direction opposite to the interpolating direction and the second color difference is difference between color components of a third image pixel in the interpolation direction and the target image pixel, (the color components of the first and second image pixels being identical to the missing color component of the target image pixel, the color component of the third image pixel being identical to the color component of the target image pixel); and an interpolation circuit, coupled to the edge detection circuit, for reconstructing at least a missing color component of the target image pixel according to a plurality of neighboring image pixels respectively in the interpolating directions and the edge indicators of the interpolating directions, each of the neighboring image pixels having a color component identical to the missing color component.

According to another embodiment of the claimed invention, a color interpolation method for processing a plurality of image pixels corresponding to a color filter array to reconstruct missing color components for each image pixel having a single color component is disclosed. The color interpolation method comprises: (a) detecting edges in a plurality of interpolating directions for a target image pixel and then generating a plurality of edge indicators respectively corresponding to the interpolating directions, wherein an edge indicator for each interpolating direction is determined by summing absolute values of a first color difference and a second color difference and then normalizing a sum of the absolute values with a stochastic adjustment factor for normalizing standard deviations of the interpolating directions, where the first color difference is between color components of a first image pixel in the interpolating direction and a second image pixel in another interpolating direction opposite to the interpolating direction, the second color difference is between color components of a third image pixel in the interpolation direction and the target image pixel, (the color components of the first and second image pixels are identical to the missing color component of the target image pixel, the color component of the third image pixel are identical to the color component of the target image pixel); and (b) reconstructing at least a missing color component of the target image pixel according to a plurality of neighboring image pixels respectively in the interpolating directions and the edge indicators of the interpolating directions, wherein each of the neighboring image pixels has a color component identical to the missing color component.

The claimed invention provides better edge-sensing capabilities and finer images. It reconstructs the missing color components of each image pixel with high accuracy, because it is based on the detection of the spatial features present in the pixel neighborhood. Through the directionally edge-adaptive weighted color interpolation, it provides sharp images without false colors and with smooth transition in hue from pixel to pixel. The directionally edge-adaptive weighted color interpolation of the claimed invention can be applied to image capturing devices such as a digital camera or a digital video (DV) camcorder.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
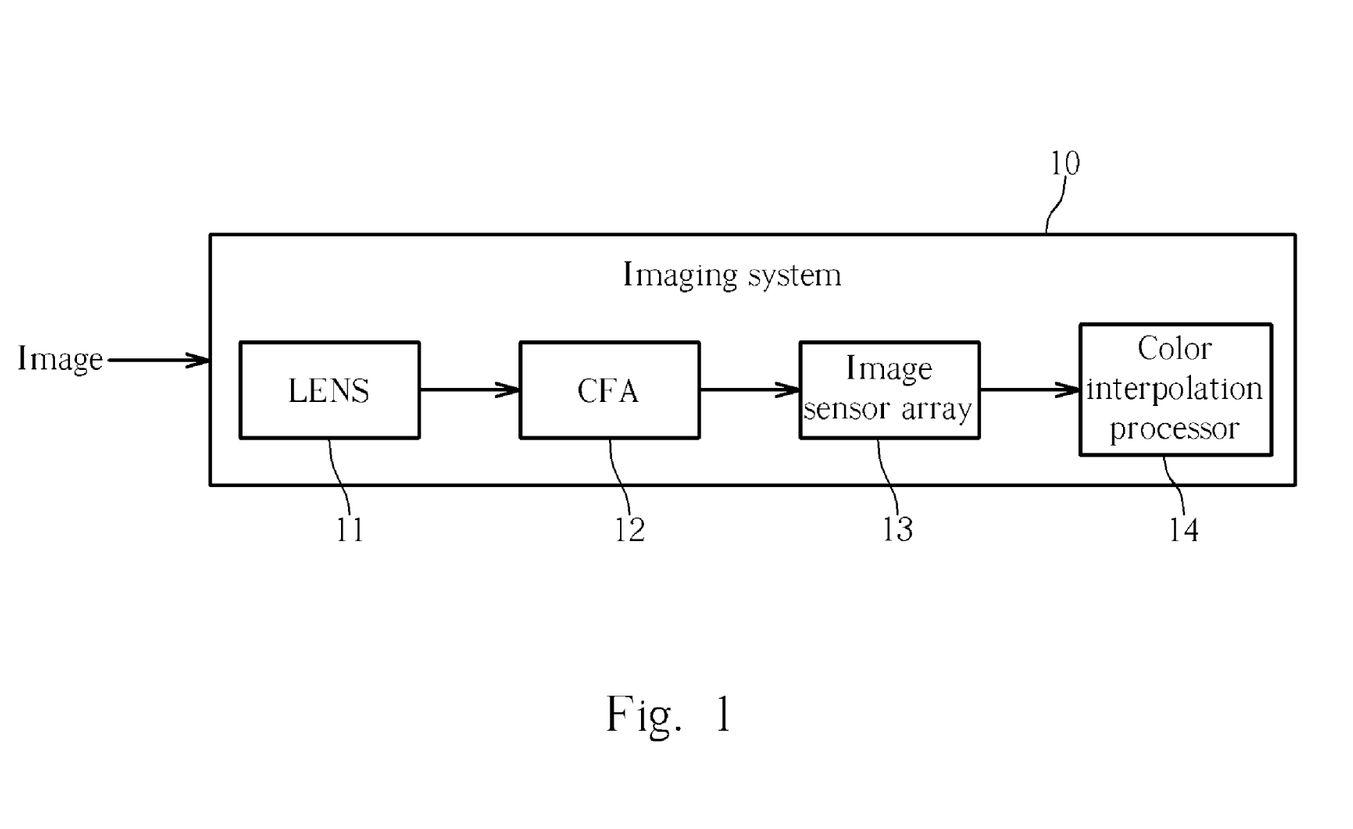
FIG. 1 is a block diagram illustrating an imaging system according to an embodiment of the present invention.

Please refer to FIG. 1. FIG. 1 is a block diagram illustrating an imaging system 10 for image capturing in a digital camera or a digital video (DV) camcorder according to an embodiment of the present invention. The imaging system 10 comprises a lens 11 for optically receiving an image; a color filter array (CFA) 12 having a specific color pattern to filter the image passing through the lens 11; an image sensor array 13 to sense output of the CFA 12; and a color interpolation processor 14 for performing the directional edge-adaptive weighted color interpolation of the present invention to reconstruct missing color components for each image pixel to get a full color image.

Figure 2:
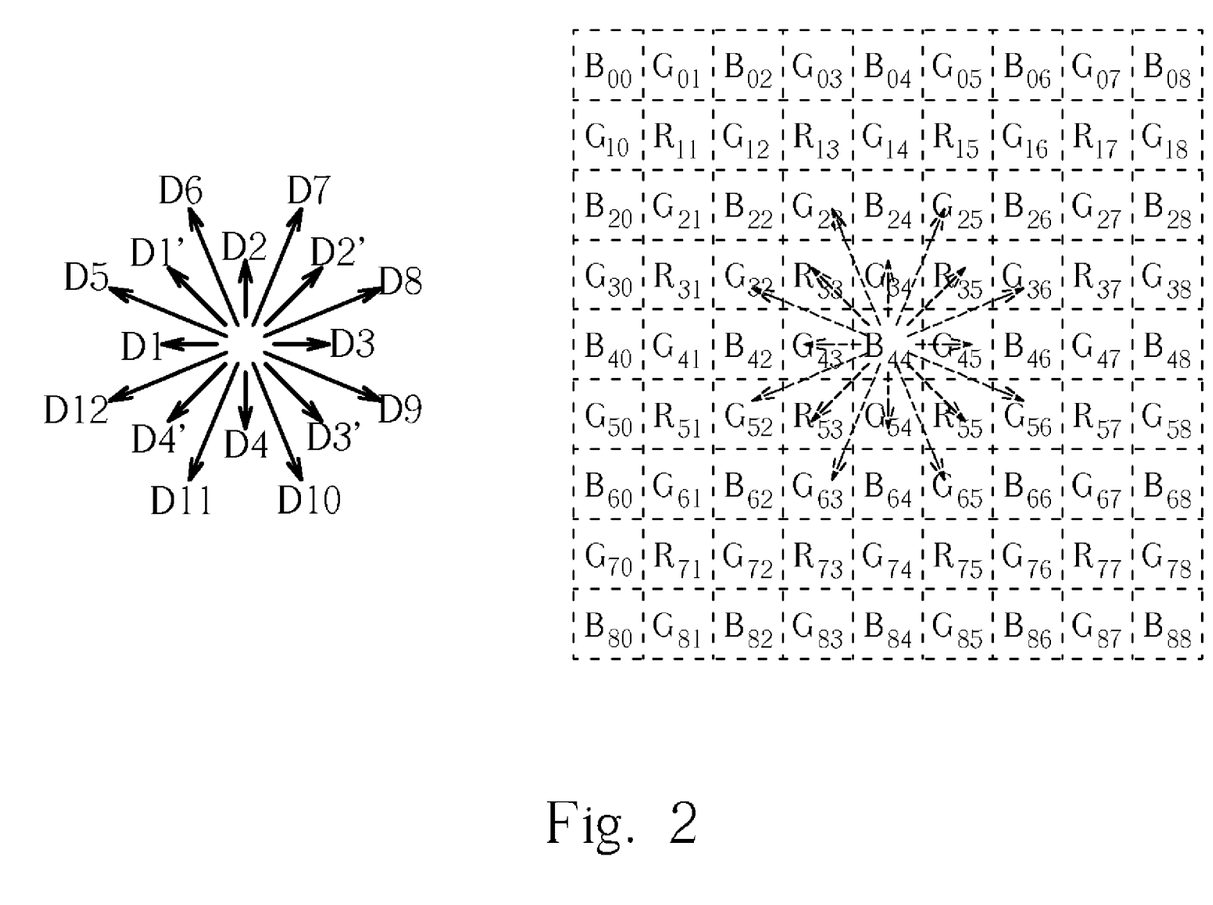
FIG. 2 is a diagram illustrating a color pattern of a color filter array shown in FIG. 1.

Please refer to FIG. 2. FIG. 2 is a diagram illustrating a color pattern 20 of the CFA 12 shown in FIG. 1. In this embodiment, the color pattern 20 is a Bayer pattern. However, please note that the present invention is not limited to using the Bayer pattern. As shown in FIG. 2, a missing color of a target image pixel $B_{44}$ is to be reconstructed. The color interpolation of the present invention makes use of twelve interpolating directions D1-D12 for reconstructing a missing green color. Based on the known Bayer pattern, the target pixel $B_{44}$ has a blue color component, the neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ each having a green color component. In this embodiment, the color interpolation processor 14 shown in FIG. 1 will perform the color interpolation in all twelve interpolating directions D1-D12 because in each of the interpolating directions color values of neighboring image pixels are green, thus all twelve neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ can provide needed color values for interpolating the wanted color component for the target image pixel $B_{44}$. On the other hand, if the missing color component of the target image pixel $B_{44}$ to be reconstructed, is not green, but lets say for example is red, then only the four nearest image pixels $R_{33}$, $R_{35}$, $R_{55}$, $R_{53}$ having the same red color component would be selected. The operation of the color interpolation processor 14 is detailed as follows.

Figure 3:
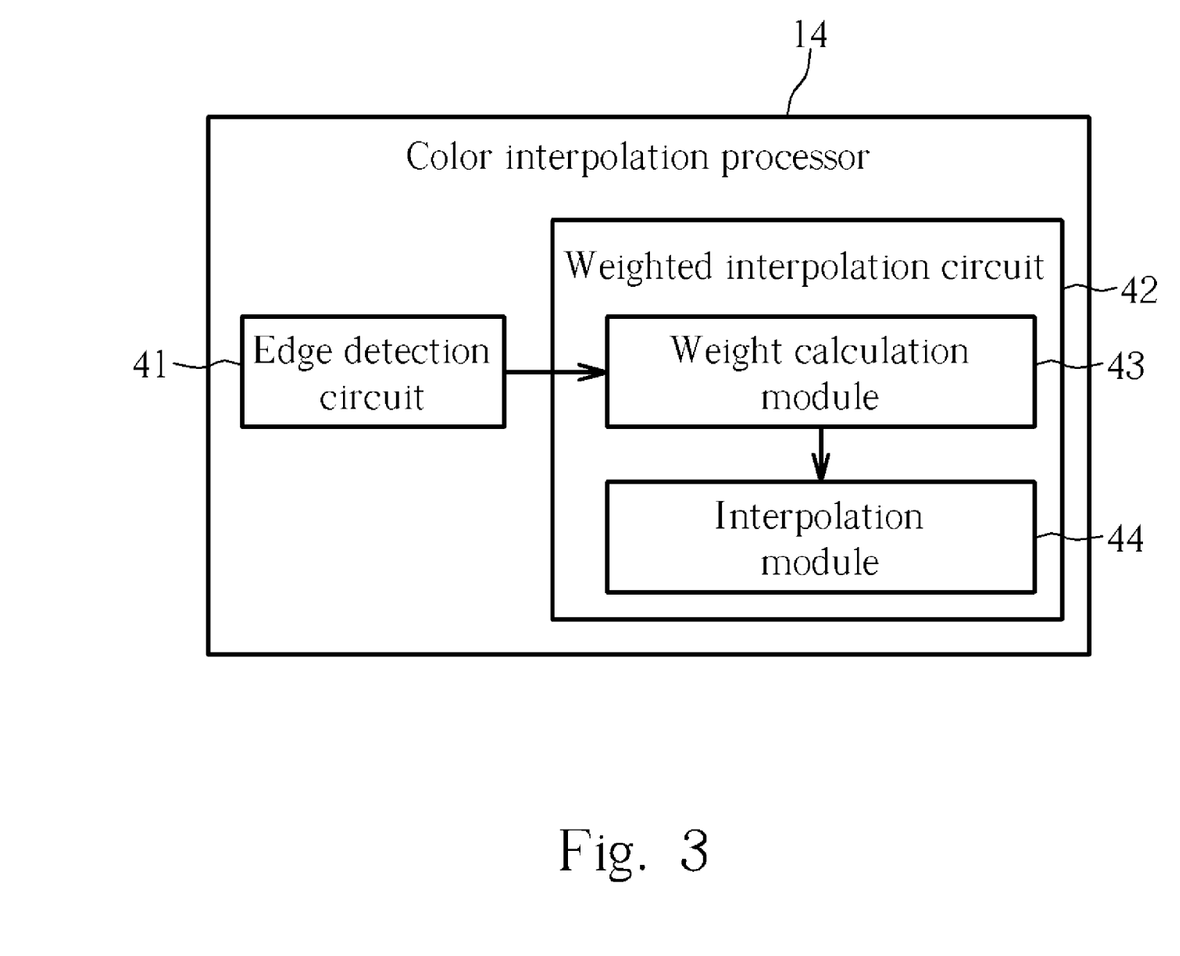
FIG. 3 is a block diagram of a color interpolation processor shown in FIG. 1.

Please refer to FIG. 3 in conjunction with FIG. 2. FIG. 3 is a block diagram of the color interpolation processor 14 shown in FIG. 1. The color interpolation processor 14 comprises an edge detection circuit 41 and a weighted interpolation circuit 42. In this embodiment, the imaging system 10 processes a plurality of image pixels corresponding to the color filter array CFA 12 in FIG. 1 to reconstruct missing color components for each image pixel. The edge detection circuit 41 is used to detect edges in the interpolating directions D1-D12 for the target image pixel $B_{44}$ and then generates a plurality of edge indicators I1-I12 respectively corresponding to the interpolating directions D1-D12. The weighted interpolation circuit 42, coupled to the edge detection circuit 41, is used to reconstruct the missing green color component of the target image pixel $B_{44}$ according to the neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ respectively in the interpolating directions D1-D12. In addition, the weighted interpolation circuit 42 is further used to reconstruct the missing red color component of the target image pixel $B_{44}$ according to the neighboring image pixels $R_{33}$, $R_{35}$, $R_{55}$, $R_{53}$.

The edge detection circuit 41 determines an edge indicator I1, I2, . . . , I12 for an interpolating direction D1, D2, . . . , D12 by summing absolute values of a first color difference and a second color difference with an adjustment process to increase the resolution of the edge indicators. The first color difference is the difference between color components of a first image pixel in the interpolating direction and a second image pixel in another interpolating direction opposite to the interpolating direction, and the second color difference is the difference between color components of a third image pixel in the interpolation direction and the target image pixel, where the color components of the first and second image pixels are identical to the missing color component of the target image pixel, and the color component of the third image pixel is identical to the color component of the target image pixel.

For increasing the resolution of the edge indicators, according to the embodiment of the present invention a stochastic edge-detecting scheme is disclosed. The stochastic edge-detecting scheme has more precise edge-sensing ability than prior art edge-detecting schemes, such as the directional-derivative method (e.g. linear adjustment in C2D2), and it can be generalized to other sets of edge orientations. In the stochastic edge-detecting scheme, an image source having a locally stationary Gaussian distribution is utilized. Therefore, the image samples within a locally stationary region will have the same stochastic mean. Denote the current image sample as $X(0)$, and a sample d pixels away from the current image sample $X(0)$, as $X(d)$. In this embodiment, image samples $X(0)$ and $X(d)$ are both within the stationary region to have the same stochastic mean. Then, the difference $X(0)-X(d)$ will be a Gaussian random variable with zero mean, and the probability that the difference value is largely away from zero will be very small. Since the goal of the edge-adaptive weighted color interpolation is to assign small weight to an image sample during the interpolation if the likeliness of an edge between the image sample and the target image pixel is high, also, since the probability distribution will be different when the differences are calculated from image samples with different distance d, the edge indicator in this embodiment is calculated by normalizing the difference value of the image samples, thereby generating a fair measure of the edge strength.

To normalize the difference values, in this embodiment, the calculated difference values are multiplied by an adjustment factor $\kappa$ such that the modified values become Gaussians with the same standard deviation (thus with the same distribution).

The derivation of the factor $\kappa$ is as follows. Let $\Omega(d)$ denote the auto-correlation function:

$$\Omega(d)=(E[(X(0)-\mu_x)(X(d)-\mu_x)])/(\sigma_x^2) \quad \text{Eq.(1)}$$

In Eq. (1), $\mu_x$ is the stochastic mean in the stationary region and $\sigma_x$ is the standard deviation. The standard deviation of the difference $X(0)-X(d)$ will be:

$$\sqrt{E[(X(0)-X(d))^2]} = \sqrt{E[((X(0)-\mu_X)-(X(d)-\mu_X))^2]} \quad \text{Eq. (2.a)}$$

$$= \sqrt{E\left[\begin{array}{c}(X(0)-\mu_X)^2 - 2(X(0)-\mu_X) \\ (X(d)-\mu_X) + (X(d)-\mu_X)^2\end{array}\right]} \quad \text{Eq. (2.b)}$$

$$= \sqrt{\sigma_X^2 - 2\sigma_X^2\Omega(d) + \sigma_X^2} \quad \text{Eq. (2.c)}$$

$$= \sigma_X\sqrt{(1-\Omega(d))} \quad \text{Eq. (2.d)}$$

Eq. (2.c) holds because of the stationary property. If a certain distance $d_1$ is set as the basic distance, for other distance $d_n$, the normalization factor $\kappa_n$ will be:

$$\kappa_n = \frac{\sigma_X\sqrt{(1-\Omega(d_1))}}{\sigma_X\sqrt{(1-\Omega(d_n))}} = \sqrt{\frac{(1-\Omega(d_1))}{(1-\Omega(d_n))}} \quad \text{Eq. (3)}$$

$\kappa_n$ can be derived when substituting $\Omega(d_1)$ and $\Omega(d_2)$ calculated by Eq. (1) into Eq. (3).

Taking the edge indicator I1 for example, it is calculated as follows:

$I1=\kappa_1*[ABS$ (the color value of $G_{43}$-the color value of $G_{45}$)+$ABS$ (the color value of $B_{42}$-the color value of $B_{44}$)] Eq.(4)

In Eq. (4), $G_{43}$ is the above-mentioned first image pixel, $G_{45}$ is the above-mentioned second image pixel, and $B_{42}$ is the above-mentioned third image pixel. Therefore, the distance $d_1$ equals 2 pixels. As shown in FIG. 2, the distances $d_1$-$d_{12}$ can be divided into two categories: $d_n=2$ for $1 \leq n \leq 4$, and $d_n=2\sqrt{5}$ for $5 \leq n \leq 12$. So the value of $\kappa_n$ will be of two kinds. Under the assumption that the autocorrelation function $\Omega(d)$ is of the form $\Omega(d)=\exp(-d^2/\tau^2)$, where $\tau$ is a image dependent factor, $\kappa_n$ will be very close to 0.5, for $5 \leq n \leq 12$, as long as the value $\Omega(d_1)$ is high. The setting of the factor $\kappa_n$ can be summarized as follows:

$$\kappa_n = \begin{cases} 1, & 1 \leq n \leq 4 \\ 0.5, & 5 \leq n \leq 12 \end{cases} \quad \text{Eq. (5)}$$

The calculation of the remaining edge indicators I2-I12 can be easily derived from the above description, Eq. (4) and Eq. (5).

In the present invention, the weighted interpolation circuit 42 shown in FIG. 3 comprises a weight calculation module 43 and an interpolation module 44. The weight calculation module 43 is used to calculate a plurality of weights W1-W12 for the neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ according to the edge indicators I1-I12. The weights $W_1$-$W_{12}$ are calculated as follows:

$$W_n = \left(\frac{1}{1+I_n}\right) \bigg/ \sum_{n=1}^{12} \frac{1}{1+I_n} \quad \text{Eq. (6)}$$

Please note that Eq. (6) is not the only way to calculate the weights. In another embodiment, other kinds of functions or a look up table can also calculate the weights, thus the present invention is not limited to Eq. (6).

The interpolation module 44, coupled to the weight calculation module 43, is used to reconstruct the missing green color component according to the weights $W_1$-$W_{12}$ calculated by Eq. (6) and color components of the neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ by summing a plurality of products of the weights W1-W12 and a plurality of color values of the neighboring image pixels $G_{43}$, $G_{34}$, $G_{45}$, $G_{54}$, $G_{32}$, $G_{23}$, $G_{25}$, $G_{36}$, $G_{56}$, $G_{65}$, $G_{63}$, $G_{52}$ to reconstruct the missing green color component for the target image pixel $B_{44}$. That is, the reconstructed green color component is equal to: $W_1$*(color value of $G_{43}$)+$W_2$*(color value of $G_{34}$)+, . . . , +$W_{12}$*(color value of $G_{52}$).

However, as described in "Effective color interpolation in CCD color filter arrays using signal correlation," IEEE Trans. on Circuit and System for Video Technology, vol. 13, no. 6, Jun. 2003, because of the high correlation between R, G, and B color components of the image captured by the imaging system 10, the color difference values (G-R, G, G-B) are relatively smoother than the (R, G, B) values. As a result, this causes the aliasing effects to be less pronounced (i.e., less visible) in the color difference space. Thus, the interpolation module 44 can apply color difference values (G-R, G, G-B) instead of (R, G, B) to reconstruct the missing green color component for better image quality. That is, in another embodiment using color difference, the reconstructed green component is equal to: (color value of $B_{44}$)+$W_1$*(color difference value between green color component and blue color component of $G_{43}$)+W2*(color difference value between green color component and blue color component of $G_{34}$)+ . . . +$W_{12}$*(color difference value between green color component and blue color component of $G_{52}$).

As to reconstructing the missing red color component of the target image pixel $B_{44}$, the color interpolation operation is similar to that for reconstructing the missing green color component. Referring to Eq. (4) and the related description, the edge indicators I1'-I4' are obtained by the edge detection circuit 41. Similarly, referring to Eq. (6) and the related description, the weights $W_1'$-$W_4'$ are obtained by the weight calculation module 43. In one embodiment, the reconstructed red color component is equal to: $W_1'$*(color value of $R_{33}$)+$W_2'$*(color value of $R_{35}$)+$W_3'$*(color value of $R_{55}$)+$W_4'$*(color value of $R_{53}$). In another embodiment using color difference, the reconstructed red color component is equal to: (reconstructed green color value of $B_{44}$)–$W_1'$*(color difference value between green color component and red color component of $R_{33}$)–$W_2'$*(color difference value between green color component and red color component of $R_{35}$)–$W_4'$*(color difference value between green color component and red color component of $R_{53}$).

In the above description, the color interpolation applied to reconstructing the missing color components for the target image pixel $B_{44}$ has been detailed. Based on the above description, those skilled in this art can easily realize that the same process can be applied to other pixels for reconstructing corresponding missing color components. Further description is omitted for brevity.

Figure 4:
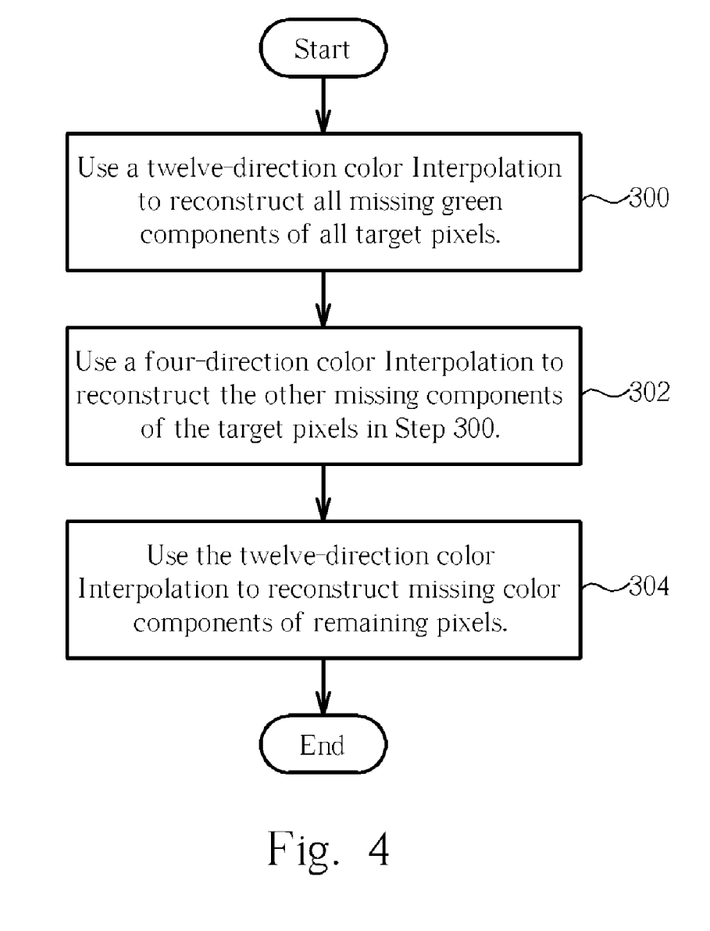
FIG. 4 is a flowchart illustrating the operation of reconstructing missing color components of a target image pixel according to an embodiment of the present invention.

Please refer to FIG. 4. FIG. 4 is a flowchart illustrating the operation of reconstructing missing color components of a target image pixel according to an embodiment of the present invention. The operation of the directional edge-adaptive weighted color interpolation to reconstruct missing colors includes the following steps:

Step 300: Use a twelve-direction color Interpolation to reconstruct all missing green components of all target pixels.

Step 302: Use a four-direction color Interpolation to reconstruct the other missing components of the target pixels in Step 300.

Step 304: Use the twelve-direction color Interpolation to reconstruct missing color components of remaining pixels. Please note that the color interpolation is performed by utilizing the hardware circuitry as shown in FIG. 1. However, the color interpolation can be implemented by software computation as well. For instance, a processor and a storage device are implemented to build the desired color interpolation apparatus, where the storage device stores a color interpolation program. Therefore, when the color interpolation program is loaded and executed by the processor, the processor is capable of performing the above-mentioned weighted color interpolation. In other words, the processor running the color interpolation program is functionality identical to that of a hardware-based color interpolation apparatus mentioned above.

In contrast to the related art, the present invention provides better edge-sensing capability and finer images. It reconstructs the missing color components of each image pixel with high accuracy, because it is based on the detection of the spatial features present in the pixel neighborhood. Through the directionally edge-adaptive weighted color interpolation, it provides sharp images without false colors and with smooth transition in hue from pixel to pixel. The directionally edge-adaptive weighted color interpolation of the present invention can be applied to image capturing devices such as a digital camera or a digital video (DV) camcorder.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color interpolation apparatus for processing a plurality of image pixels corresponding to a color filter array to reconstruct missing color components for each image pixel having a single color component, the color interpolation apparatus comprising:

an edge detection circuit for detecting edges in a plurality of interpolating directions for a target image pixel and then generating a plurality of edge indicators respectively corresponding to the interpolating directions, the edge detection circuit determining an edge indicator for an interpolating direction by summing absolute values of a first color difference and a second color difference and then determining the edge indicator for the interpolating direction by normalizing a sum of the absolute values with a stochastic adjustment factor for normalizing standard deviations of the interpolating directions, the first color difference being between color components of a first image pixel in the interpolating direction and a second image pixel in another interpolating direction opposite to the interpolating direction, the second color difference being between color components of a third image pixel in the interpolation direction and the target image pixel, the color components of the first and second image pixels being identical to the missing color component of the target image pixel, the color component of the third image pixel being identical to the color component of the target image pixel; and an interpolation circuit, coupled to the edge detection circuit, for reconstructing at least a missing color component of the target image pixel according to a plurality of neighboring image pixels respectively in the interpolating directions and the edge indicators of the interpolating directions, each of the neighboring image pixels having a color component identical to the missing color component.

2. The color interpolation apparatus of claim 1, wherein the interpolation circuit comprises:

a weight calculation module for calculating a plurality of weights for the neighboring image pixels according to the edge indicators; and an interpolation module, coupled to the weight calculation module, for reconstructing the missing color component according to the weights and color components of the neighboring image pixels.

3. The color interpolation apparatus of claim 2, wherein the interpolation module reconstructs the missing color component by summing a plurality of products of the weights and color components of the neighboring image pixels.

4. The color interpolation apparatus of claim 1, wherein the color filter array is a Bayer pattern.

5. The color interpolation apparatus of claim 1 being applied to an image capturing device.

6. The color interpolation apparatus of claim 5, wherein the image capturing device is a digital camera or a digital video (DV) camcorder.

7. A color interpolation method for processing a plurality of image pixels corresponding to a color filter array to reconstruct missing color components for each image pixel having a single color component, the color interpolation method comprising:

(a) using an edge detection circuit for detecting edges in a plurality of interpolating directions for a target image pixel and then generating a plurality of edge indicators respectively corresponding to the interpolating directions, wherein an edge indicator for an interpolating direction is determined by summing absolute values of a first color difference and a second color difference and then normalizing a sum of the absolute values with a stochastic adjustment factor for normalizing standard deviations of the interpolating directions, the first color difference is between color components of a first image pixel in the interpolating direction and a second image pixel in another interpolating direction opposite to the interpolating direction, the second color difference is between color components of a third image pixel in the interpolation direction and the target image pixel, the color components of the first and second image pixels are identical to the missing color component of the target image pixel, the color component of the third image pixel are identical to the color component of the target image pixel; and (b) using an interpolation circuit for reconstructing at least a missing color component of the target image pixel according to a plurality of neighboring image pixels respectively in the interpolating directions and the edge indicators of the interpolating directions, wherein each of the neighboring image pixels has a color component identical to the missing color component.

8. The color interpolation method of claim 7, wherein step (a) further comprises:
   (a1) using a weight calculation module for calculating a plurality of weights for the neighboring image pixels according to the edge indicators; and
   (a2) using an interpolation module for reconstructing the missing color component according to the weights and color components of the neighboring image pixels.

9. The color interpolation method of claim 8, wherein step (a2) further comprises summing a plurality of products of the weights and color components of the neighboring image pixels.

10. The color interpolation method of claim 7, wherein the color filter array is a Bayer pattern.

11. The color interpolation method of claim 7 being applied to an image capturing device.

12. The color interpolation method of claim 11, wherein the image capturing device is a digital camera or a digital video (DV) camcorder.

* * * * *